Feb. 8, 1955 W. H. DEVONSHIRE 2,701,600
TRACTION CHAIN LINK
Filed June 8, 1954

INVENTOR.
WILLIAM H. DEVONSHIRE
BY
Beau, Brooks, Buckley & Beau,
ATTORNEYS.

United States Patent Office 2,701,600
Patented Feb. 8, 1955

2,701,600

TRACTION CHAIN LINK

William H. Devonshire, Williamsville, N. Y., assignor to Columbus McKinnon Chain Corporation, Tonawanda, N. Y.

Application June 8, 1954, Serial No. 435,333

4 Claims. (Cl. 152—245)

This invention relates to automotive vehicle tire chains, and more particularly to improvements in traction links for the same. This application is a continuation-in-part of each of my pending applications Serial Nos. 102,577 and 209,882, filed July 1, 1949 and February 7, 1951, respectively, and now abandoned.

One of the objects of the invention is to provide an improved traction chain link which operates with improved traction effects and is of increased wearing life.

Another object of the invention is to provide an improved traction chain link for rubber tired vehicle wheels, which presents to the roadway a traction surface of improved rugosity and to the tire tread a generally flat surface free from tire cutting protuberances.

Another object of the invention is to provide an improved traction chain link which embodies an improved form of transverse reinforcing bar.

Another object of the invention is to embody in a traction chain link of the "twisted" type, an improved bar reinforcement arrangement which provides both improved reinforcing of the chain link and improved traction characteristics.

Another object of the invention is to embody in a transverse welded bar reinforced traction chain link a bar which is of improved shape so as to reinforce in improved manner the welded connection between the link and the bar.

Another object of the invention is to provide an improved traction chain link for rubber tired vehicle wheels, which link comprises in combination a tension link and road contact bar so arranged as to present to the tire tread a surface form which results in transmission of road shocks through the bar directly to the tire tread.

Another object of the invention is to provide an improved traction chain link which embodies an improved tension link and traction cross bar arrangement.

Another object of the invention is to embody in a traction chain link of the "twisted" type, an improved cross welded traction bar arrangement which provides improved protection for the tension link and for the welds holding the bar to the link.

Other objects and advantages of the invention will appear from the specification hereinafter.

Figure 1:
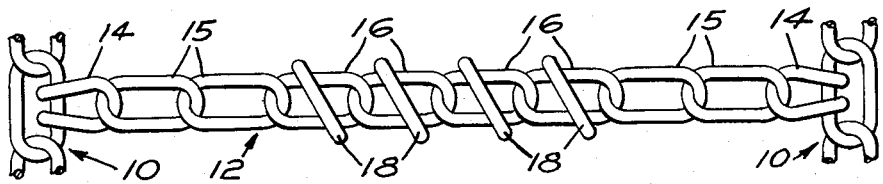
Fig. 1 is a fragmentary illustration of a tire chain including a cross chain member having traction links of the present invention; the tire tread engaging side of the cross chain being shown in plan view.

It is to be understood that the invention is applicable to any style traction chain such as may be applied to rubber tired vehicle wheels; while in the drawing the invention is illustrated in conjunction with a typical automobile traction chain including a pair of side chains 10—10 which are adapted to be arranged against the opposite side walls of an automobile tire. The side chains 10 are interconnected by a series of transverse cross chains 12 which are arranged to extend across the tread portion of the tire at suitable intervals therearound. Each cross chain member is illustrated to comprise a pair of end hooks 14—14; body links 15, and tread links 16. The links 15, and the tread links 16 are basically of the "twisted" type, such as are made from heavy wire stock pieces bent into loop form and welded together at their abutting ends, and then twisted so that in end view the opposite end portions of the links are relatively displaced at a substantially 90° angle.

In accord with the present invention the tread links 16 are constructed to each include a reinforcing bar of metal wire which is crimped around the link so as to extend transversely thereof as indicated at 18. The reinforcing bar 18 is disposed relative to the link so as to lie against the "low" portions of the twisted link side legs when viewed from the tire engaging side thereof, while avoiding interferences with interlinking of the adjacent chain links. The links are so twisted and the cross bars are so dimensioned and positioned thereon that they cooperate as illustrated at Fig. 3 with the relatively high end portions 20—20 of the links 16 to provide therebetween a broad and substantially level base for bearing against the tread portion of the wheel tire.

Thus, the cross chain member includes at the tread portion thereof a plurality of traction links which are each formed to present a broad base of substantially smooth and flat form against the wheel tire, whereby the cross chain does not tend to cut into and damage the tread of the vehicle wheel tire. Also, this arrangement assists in resisting the tendencies of such cross chains to "roll" under the tire tread; and thus the traction "grip" side of the chain is always presented to the roadway and the relatively smooth side of the chain is also maintained against the tire tread.

Figure 2:
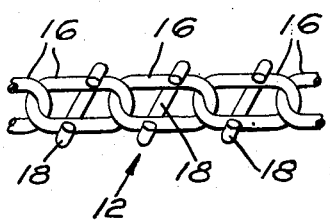
Fig. 2 is a fragmentary plan view of the roadway contacting side of the cross chain member of Fig. 1.
Figure 3:
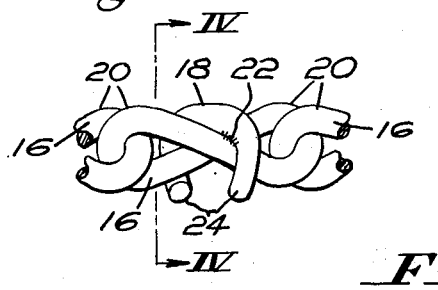
Fig. 3 is a fragmentary side elevation of the cross chain member.
Figure 4:
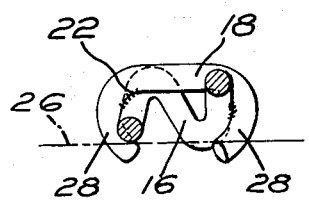
Fig. 4 is a section taken along line IV—IV of Fig. 3.

As illustrated more particularly in Figs. 2-3-4, the opposite ends of the cross bar pieces 18 are welded as indicated at 22 to the links and are crimped downwardly at each side of the corresponding link toward the roadway surface and then slightly inwardly so as to provide the reinforcing bar in its final form to be substantially C-shaped as viewed in side elevation (Fig. 4). This arrangement of the reinforcing bar relative to the link causes the bar to be substantially "wrapped" around the side legs of the link 16 in the regions of the welded connections between the link and the reinforcing bar and thus the welded connections between the links and the cross bars are mechanically reinforced against road impact loads which transmit through the downwardly extending end prongs of the reinforcing bars, such as would otherwise tend to rupture the welds and separate the bars from the links. Also, this mode of bending the road contacting end portions of the reinforcing bars presents the sharp corner portions 24 (Fig. 4) of the reinforcing bar legs to the roadway surface; instead of disposing the flat ends of the reinforcing bars in flat relation against the roadway surface, as would be the case if the legs of the reinforcing bars were bent to extend normal to the roadway surface.

Thus, it will be appreciated that in the case of the present invention the connections between the link 16 and the bar 18 are reinforced in improved manner, while the bent-in end portions of the reinforcing bar members operate also to provide improved roadway gripping prongs which are adapted to cut into an icy road coating or the like to provide improved traction effects. Also, the relatively broad and flat back formation of the chain at the tire engaging side thereof reduces tendencies of the chain to "roll" under the tire tread, and thereby causes the traction side of the chain to be always presented to the roadway.

The bent end portions of the reinforcing bars take the initial road wear during the early life of the chains, and thereby protect the twisted link elements from road wear for a substantial time. Then, the links per se subsequently receive the wear and function in road gripping manner until they are completely worn out. Because the reinforcing bar is welded to the tire tread side of the chain link the reinforcing bar "backs up" and transversely reinforces the link against "pull-a-part" breakage throughout the entire life of the link whereas in the case of prior type bar-reinforced links the bars wear off first and then leave the links unprotected with the result that they often break and pull apart before they are actually worn out.

It is another feature of the present invention that the road contacting end portions of the link reinforcing bars are "self-sharpening." For example, it will be appreciated that as road-wear levels off the downwardly projecting points 24 of the bars 18, the bars will then progressively wear to levels such as indicated at 26 (Fig. 4); thereby producing inturned ice "prongs" 28 which tend to dig into the icy coating of a highway surface with improved traction results. Because of the vertically inclined attitudes of the legs of the reinforcing bars, such progressive wearing away of the bar ends simply continues to produce sharp "ice prong" formations thereon; and these prong formations become particularly effective whenever the cross chains roll slightly under the tire tread as is induced by traction forces.

Figure 5:
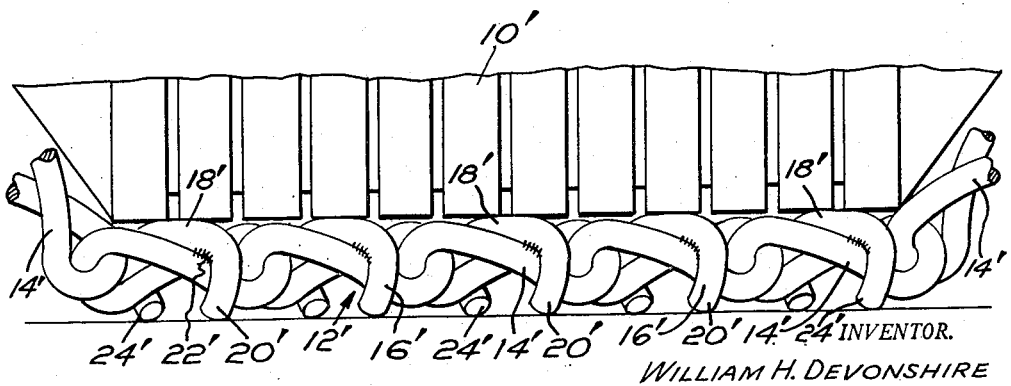
Fig. 5 is a fragmentary view of a tire cross chain member incorporating a modified form of traction link in accord with the present invention.

In accord with the modified form shown in Fig. 5, the tension links 14' are constructed to each include a traction bar of metal wire which is crimped around the link so as to extend obliquely transversely thereof as indicated at 16'. The bar 16' is disposed relative to the link so as to lie in the "low" portions of the twisted link side legs when viewed from the tire engaging side thereof, while avoiding interferences with interlinking of the adjacent chain links. The links are so twisted and the cross bars are so dimensioned and positioned thereon that as illustrated in Fig. 5 the relatively high central portions 18' of the bars 16' bear against the tire tread 10' and hold the tension links 14' away from bearing against the tread portion of the wheel tire. Also, the ends 20'—20' of the bars 16' are arranged to bear against the roadway and to hold the tension links away from bearing contact therewith.

More specifically, as illustrated in Fig. 5 the cross bar pieces 16' are welded as indicated at 22' to the links and are crimped downwardly at each side of the corresponding link toward the roadway surface and then slightly inwardly so as to provide the bar in its final form to be either U-shaped or C-shaped as viewed in side elevation. This arrangement of the bar relative to the link causes the bar to be substantially "wrapped" around the side legs of the link 14' in the regions of the welded connections between the link and the bar; and thus the welded connections between the links and the cross bars are mechanically reinforced against road impact loads which transmit through the downwardly extending end prongs 20—20' of the bars directly to the tire tread. It has been discovered that this "direct transmission" of road shocks through the bar 16' to the tire tread relieves the tension links 14' of fatiguing stresses and eliminates shock transmissions such as would otherwise tend to rupture the welds and separate the bars from the links. Also, this mode of bending the road contacting end portions of the reinforcing bars presents the sharp corner portions 24' of the bar legs to the roadway surface for improved traction effects.

Thus, it will be appreciated that in the case of the present invention the tension links 14' are protected and the connections between the link 14' and the bar 16' are reinforced in improved manner, and also that the relatively broad and flat back formations 18' of the bar 16' at the tire engaging side thereof reduces tendencies of the entire chain to "roll" under the tire tread. This causes the traction side of the cross chain to be always presented to the roadway.

It will be appreciated that the cross bars 16' may be fabricated relative to the links 14' by any suitable method in order to obtain the novel positional relationship referred to hereinabove; and in some cases it may be found desirable to initially weld the bar in straight bar form across the link, and then bend the bar ends around the link while at the same time die-pressing the ends of the link away from tire tread engaging position. This insures the proper shape for the finished article.

Although only one form of the invention has been shown and described in detail, it will be apparent to those skilled in the art that the invention is not so limited but that various changes may be made therein without departing from the spirit of the invention or the scope of the appended claims.

I claim:
1. A wheel tire traction chain link comprising a substantially 90° twisted link and a reinforcing bar having an intermediate portion disposed to extend obliquely transversely of said link against the tire tread contacting side thereof, said reinforcing bar being fixed to the side leg portions of said link in the relatively low portions thereof as viewed from the tire contacting side thereof while avoiding interferences with the linking of adjacent links into the end portions of said link, said bar having its opposite ends extending beyond the plan view sidewise configurations of said link and then downwardly around the opposite side leg portions of said link in closely fitting wrapped around relation therewith, said bar ends terminating in downwardly and inwardly inclined portions coinciding in plan view with said intermediate portion, said reinforcing bar comprising a length of square end cut wire stock whereby said bar terminal end portions provide sharp edge portions directed against the roadway.

2. A wheel tire traction chain link comprising a substantially 90° twisted link, and a reinforcing bar disposed to extend transversely of said link across and against the tire tread contacting side thereof, said reinforcing bar having end portions extending outwardly beyond and crimped downwardly around the side leg portions of said link at the relatively low portions thereof as viewed from the tire contacting side thereof while avoiding interferences with the linking of adjacent links into the end portions of said link, said bar having its opposite ends extending beyond the plan view sidewise configurations of said link and downwardly around the opposite side leg portions of said link in closely fitting wrapped around relation therewith; said bar ends terminating in diagonally extending inwardly and downwardly inclined portions disposed under the link and coinciding in plan view with the intermediate bar portion and having free ends spaced from each other transversely of the link.

3. A wheel tire traction chain link as set forth in claim 2, wherein said intermediate reinforcing bar portion and said opposite end portions of said link are all disposed in substantially the same plane to have contact with the tire tread.

4. A wheel tire traction chain as set forth in claim 2, wherein said intermediate reinforcing bar portion is disposed at an elevation above said opposite end portions of said link to contact the tire tread and to hold said opposite link end portions out of contact therewith.

References Cited in the file of this patent

UNITED STATES PATENTS

| | | |
|---|---|---|
| 1,312,729 | Heller | Aug. 12, 1919 |
| 1,461,327 | Reyburn | July 10, 1923 |
| 1,461,378 | Borst, Jr. | July 10, 1923 |
| 1,550,578 | Senft | Aug. 18, 1925 |
| 1,651,439 | Boyer | Dec. 6, 1927 |
| 1,788,486 | Hall | Jan. 13, 1931 |
| 1,845,026 | Lewis | Feb. 16, 1932 |
| 2,180,097 | Reyburn | Nov. 14, 1939 |
| 2,180,098 | Hall | Nov. 14, 1939 |
| 2,295,722 | Donaldson | Sept. 15, 1942 |
| 2,300,383 | Haynes | Oct. 27, 1942 |
| 2,562,964 | Stuller | Aug. 7, 1951 |

FOREIGN PATENTS

| | | |
|---|---|---|
| 50,828 | Norway | June 18, 1934 |